United States Patent
Zhang

(10) Patent No.: US 10,162,100 B2
(45) Date of Patent: Dec. 25, 2018

(54) BACKLIGHT SOURCE STRUCTURE WITH ASSEMBLED LIGHT-GUIDING LIGHT SOURCE ELEMENTS AND LIQUID CRYSTAL DISPLAY APPARATUS HAVING THE SAME

(71) Applicant: WUHAN CHINA STAR OPTOELECTRONICS TECHNOLOGY CO., LTD., Wuhan, Hubei (CN)

(72) Inventor: Yanxue Zhang, Hubei (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 188 days.

(21) Appl. No.: 15/122,936

(22) PCT Filed: May 17, 2016

(86) PCT No.: PCT/CN2016/082385
§ 371 (c)(1),
(2) Date: Sep. 1, 2016

(87) PCT Pub. No.: WO2017/152494
PCT Pub. Date: Sep. 14, 2017

(65) Prior Publication Data
US 2018/0149803 A1 May 31, 2018

(30) Foreign Application Priority Data
Mar. 8, 2016 (CN) .......................... 2016 1 0128731

(51) Int. Cl.
F21V 8/00 (2006.01)

(52) U.S. Cl.
CPC .......... *G02B 6/0078* (2013.01); *G02B 6/0055* (2013.01); *G02B 6/0065* (2013.01);
(Continued)

(58) Field of Classification Search
CPC .. G02B 6/0078; G02B 6/0083; G02B 6/0055; G02B 6/0065; G02B 6/0091; G02B 6/0068
See application file for complete search history.

(56) References Cited

U.S. PATENT DOCUMENTS 8,622,600 B2 1/2014 Cheng et al.
8,760,603 B2 6/2014 Kweon
(Continued)

FOREIGN PATENT DOCUMENTS

CN 102235621 A 11/2011
CN 102297369 A 12/2011
(Continued)

OTHER PUBLICATIONS

Lu et al., Chinese Patent 20374389, Jul. 2014, machine translation.*
Wen et al., CN103247608, Aug. 2013, machine translation.*

*Primary Examiner* — Tracie Y Green
(74) *Attorney, Agent, or Firm* — Soroker Agmon Nordman

(57) ABSTRACT

A backlight source structure of a liquid crystal display apparatus is provided and includes a plurality of light-guiding light source elements. Each of the light-guiding light source elements includes: a light source and a light-source packaging body. The light-source packaging body is an elongated strip with a light-guiding effect. The light-guiding light source elements are connected to form a light guide plate. A situation where an entire light guide plate malfunctions due to partial damage is prevented.

17 Claims, 3 Drawing Sheets

(52) U.S. Cl.
CPC .......... *G02B 6/0068* (2013.01); *G02B 6/0083* (2013.01); *G02B 6/0091* (2013.01)

(56) References Cited

U.S. PATENT DOCUMENTS

| | | | |
|---|---|---|---|
| 9,784,909 B2* | 10/2017 | Pei | G02B 6/0088 |
| 2009/0296026 A1* | 12/2009 | Bae | G02B 6/008 |
| | | | 349/65 |
| 2015/0219835 A1* | 8/2015 | Kim | G02F 1/133308 |
| | | | 362/609 |
| 2016/0327718 A1* | 11/2016 | Liu | G02B 6/005 |
| 2017/0108639 A1* | 4/2017 | Zhang | G02B 6/0088 |
| 2017/0123142 A1* | 5/2017 | Zhang | G02B 6/0083 |
| 2017/0131454 A1* | 5/2017 | Zhang | G02B 6/0036 |
| 2017/0146717 A1* | 5/2017 | Zeng | G02B 6/0026 |
| 2017/0168207 A1* | 6/2017 | Liu | G02B 6/002 |

FOREIGN PATENT DOCUMENTS

| | | |
|---|---|---|
| CN | 103247608 A | 8/2013 |
| CN | 203743895 U | 7/2014 |
| CN | 10544981 A | 11/2015 |

* cited by examiner

BACKLIGHT SOURCE STRUCTURE WITH ASSEMBLED LIGHT-GUIDING LIGHT SOURCE ELEMENTS AND LIQUID CRYSTAL DISPLAY APPARATUS HAVING THE SAME

BACKGROUND OF THE INVENTION

Field of the Invention

The present invention relates to the technical field of backlight source, and more particularly to a backlight source structure and a liquid crystal display apparatus having the same.

Description of the Related Art

At present, a liquid crystal display apparatus generally includes structures of backlight sources. Backlight is a type of illumination used in display technologies of liquid crystal display apparatuses; it is used to increase the intensity of illumination and the brightness of a liquid crystal display apparatus under low light circumstances. A backlight board is mounted at a rear of the liquid crystal display apparatus. In addition to providing a light source, it also turns non-uniform light emitted from the light source into uniform light.

With the development of consumer electronics technology, in the present product design for a backlight module of a liquid crystal display apparatus, a light source and a light guide plate are often used to be assembled to form a light system. In such design, the light source and the light guide plate will be manufactured separately and then be assembled together. For such design, the packaging of the light source, the formation of the light guide plate, and the assembling of light source and the light guide plate are all involved in the cost of component materials and labor required for assembly. Besides, once the light guide plate is partially damaged, it cannot be use anymore, which results in higher cost. Moreover, in this design, the light uniformity of the backlight module is adjusted through distribution of dots, which is not easy to achieve high uniform emission.

SUMMARY OF THE INVENTION

An objective of the present invention is to provide backlight source structure and a liquid crystal display apparatus having the same so as to solve the technical problem that when manufacturing a backlight module for a liquid crystal display, an LED light source and a light guide plate have to be made respectively and then be assembled together, which results in more manufacturing steps and costs, and the technical problem that once the light guide plate is partially damaged, it cannot be use anymore, and also the problem that light uniformity is not easy to achieve.

The technical solutions of the present invention are as follows:

A backlight source structure of a liquid crystal display apparatus includes a plurality of light-guiding light source elements, wherein each of the light-guiding light source elements includes:

at least one light source used to emit light; and a light-source packaging body used to package the light source and guide the light emitted from the light source toward a display panel; wherein each of the light-source packaging bodies is an elongated strip having a light-guiding effect; the light-guiding light source elements are connected with each other to form a light guide plate; the light-guiding light source elements are connected with each other through at least one detachable structure; the light source is at least one LED device; the LED devices of the light-guiding light source elements are connected in parallel; a lead of the LED device is directly connected to a chip of the LED device, and another lead of the LED device is connected to an electric power.

Preferably, the light source is packaged inside a side end of the light-source packaging body.

Preferably, the light sources are packaged inside two opposite side ends of the light-source packaging body.

Preferably, the light-source packaging body is made of acrylic plastics.

Preferably the light-source packaging body is made of polycarbonate.

Preferably, the backlight source structure further includes a reflector, a sealing frame and an electric circuit board; the reflector is fixed on a bottom surface of the light-source packaging body via the sealing frame; the electric circuit board is fixed near the light source on a top surface of the light-source packaging body via the sealing frame.

A backlight source structure of a liquid crystal display apparatus includes a plurality of light-guiding light source elements, wherein each of the light-guiding light source elements includes:

at least one light source used to emit light; and a light-source packaging body used to package the light source and guide the light emitted from the light source toward a display panel; wherein each of the light-source packaging bodies is an elongated strip having a light-guiding effect; the light-guiding light source elements are connected with each other to form a light guide plate.

Preferably, the light-guiding light source elements are connected with each other through at least one detachable structure.

Preferably, the light source is at least one LED device; the LED devices of the light-guiding light source elements are connected in parallel; a lead of the LED device is directly connected to a chip of the LED device, and another lead of the LED device is connected to an electric power.

Preferably, the light source is packaged inside a side end of the light-source packaging body.

Preferably, the light sources are packaged inside two opposite side ends of the light-source packaging body.

Preferably, the light-source packaging body is made of acrylic plastics or polycarbonate.

Preferably, the backlight source structure further includes a reflector, a sealing frame and an electric circuit board; the reflector is fixed on a bottom surface of the light-source packaging body via the sealing frame; the electric circuit board is fixed near the light source on a top surface of the light-source packaging body via the sealing frame.

A liquid crystal display apparatus including a backlight source structure, wherein the backlight source structure includes a plurality of light-guiding light source elements, wherein each of the light-guiding light source elements includes:

at least one light source used to emit light; and a light-source packaging body used to package the light source and guide the light emitted from the light source toward a display panel; wherein each of the light-source packaging bodies is an elongated strip having a light-guiding effect; the light-guiding light source elements are connected with each other to form a light guide plate.

Preferably, the light-guiding light source elements are connected with each other through at least one detachable structure.

Preferably, the light source is at least one LED device; the LED devices of the light-guiding light source elements are connected in parallel; a lead of the LED device is directly connected to a chip of the LED device, and another lead of the LED device is connected to an electric power.

Preferably, the light source is packaged inside a side end of the light-source packaging body.

Preferably, the light sources are packaged inside two opposite side ends of the light-source packaging body.

Preferably, the light-source packaging body is made of acrylic plastics or polycarbonate.

Preferably, the backlight source structure further includes a reflector, a sealing frame and an electric circuit board; the reflector is fixed on a bottom surface of the light-source packaging body via the sealing frame; the electric circuit board is fixed near the light source on a top surface of the light-source packaging body via the sealing frame.

Advantages of the Present Invention

In the backlight source structure and the liquid crystal display apparatus having the same of the present invention, a plurality of light-guiding light source elements, each of which has a light source and a light-source packaging body having light-guiding effect, are used and connected with each other to form a light guide plate. Thus, it is not necessary to manufacture a single light guide plate, thereby saving manufacturing costs and simplifying procedures. In the meantime, the light uniformity of backlight structure can be adjusted by adjusting one light-guiding light source element, and the situation that an entire light guide plate cannot be used due to partial damage will not occur.

DETAILED DESCRIPTION OF THE PREFERRED EMBODIMENTS

Figure 1:
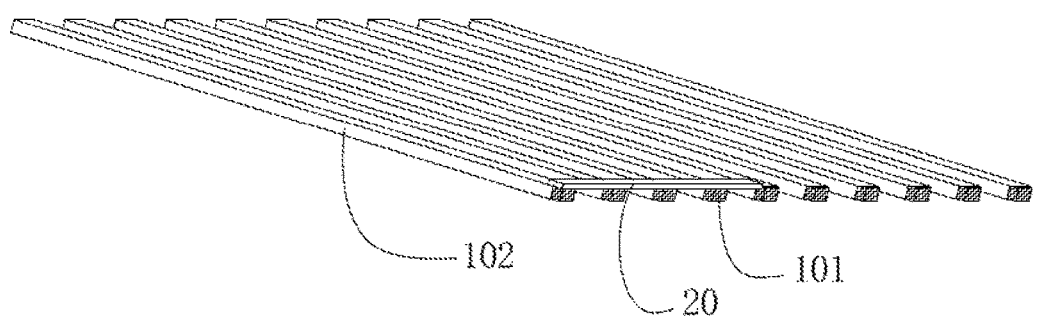
FIG. 1 is an exploded perspective view of an assembly of a plurality of light-guiding light source elements and an electric circuit board according to a preferred embodiment of the present invention.

The foregoing objects, features and advantages adopted by the present invention can be best understood by referring to the following detailed description of the preferred embodiments and the accompanying drawings. Furthermore, the directional terms described in the present invention, such as upper, lower, front, rear, left, right, inner, outer, side and etc., are only directions referring to the accompanying drawings, so that the used directional terms are used to describe and understand the present invention, but the present invention is not limited thereto. In the drawings, similar structural units are designated by the same reference numerals.

First Embodiment

Figure 2:
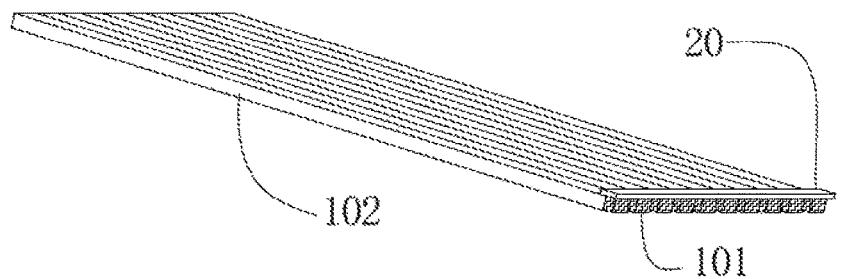
FIG. 2 is a perspective view of an assembly of a plurality of light-guiding light source elements and an electric circuit board according to a preferred embodiment of the present invention.
Figure 3:
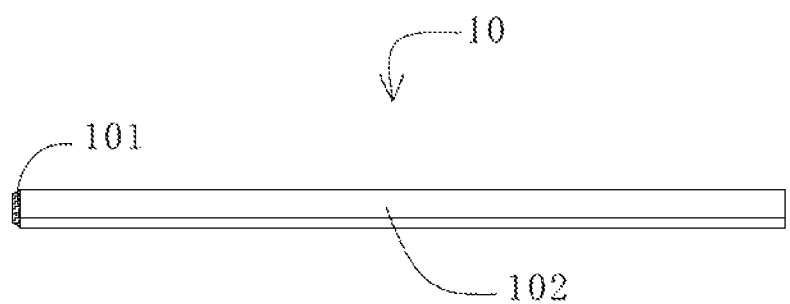
FIG. 3 is a perspective view showing an exterior structure of a single light-guiding light source element according to a preferred embodiment of the present invention.
Figure 4:
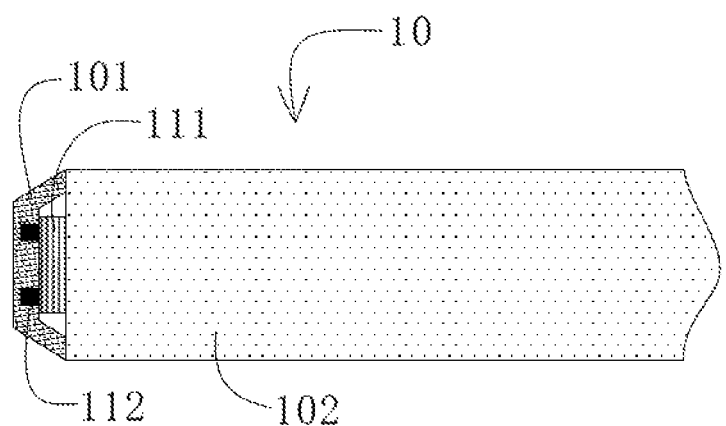
FIG. 4 is a perspective view showing a cross-sectional structure of a single light-guiding light source element according to a preferred embodiment of the present invention.
Figure 5:
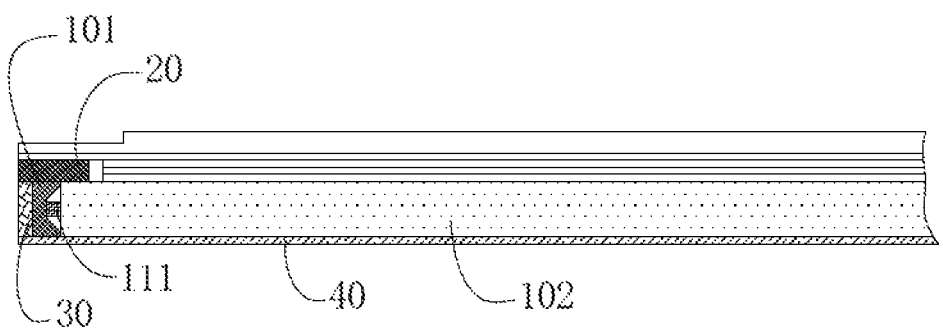
FIG. 5 is a partial cross-sectional side view of an assembly of a plurality of light-guiding light source elements, a sealing frame, a reflector and an electric circuit board according to a preferred embodiment of the present invention.

As shown from FIG. 1 to FIG. 5, FIG. 1 is an exploded perspective view of an assembly of a plurality of light-guiding light source elements 10 and an electric circuit board 20 according to an embodiment of the present invention FIG. 2 is a perspective view of the assembly of the plurality of light-guiding light source elements 10 and the electric circuit board 20 according to the embodiment of the present invention; FIG. 3 is a perspective view showing an exterior structure of a single light-guiding light source element 10 according to the embodiment of the present invention; FIG. 4 is a perspective view showing a cross-sectional structure of the single light-guiding light source element 10 according to the embodiment of the present invention; and FIG. 5 is a partial cross-sectional side view of an assembly of a plurality of light-guiding light source elements 10, a sealing frame 30, a reflector 40 and an electric circuit board 20 according to a preferred embodiment of the present invention. It can be seen from FIG. 1 to FIG. 5 that:

A backlight source structure of a liquid crystal display apparatus of the present embodiment includes a plurality of light-guiding light source elements 10. Each of the light-guiding light source elements 10 includes:

at least one light source which is used to emit light; and a light-source packaging body 102 which is used to package the light source and guide the light emitted from the light source toward a display panel.

Each of the light-source packaging bodies 102 is an elongated strip having a light-guiding effect. The light-guiding light source elements 10 are connected with each other to form a light guide plate.

In the present embodiment, the light-guiding light source elements 10 are connected with each other through at least one detachable structure.

In the present embodiment, the at least one light source is an LED device 101; the LED devices 101 of the light-guiding light source elements are connected in parallel (as shown in FIG. 1 and FIG. 2). A lead 112 of the LED device 101 is directly connected to a chip 111 of the LED device 101 (as shown in FIG. 4), and another lead of the LED device is connected to an electric power. In the conventional technology, the chip 111 of the LED device 101 will need to be connected to the lead 112 through a wire. The present invention can save the use of wires and therefore reduce manufacturing cost.

In the present embodiment, the light source is packaged inside a side end of the light-source packaging body 102 (as shown in FIG. 3).

In the present embodiment, the light sources are packaged inside two opposite side ends of the light-source packaging body 102 (not marked in the figures).

In the present embodiment, the light-source packaging body 102 is made of acrylic plastics or polycarbonate.

In the present embodiment, as shown in FIG. 5, the backlight source structure further includes a reflector 40, a sealing frame 30 and an electric circuit board 20. The reflector 40 is fixed on a bottom surface of the light-source packaging body 102 via the sealing frame 30. The electric circuit board 20 is fixed near the light source on a top surface of the light-source packaging body 102 via the sealing frame 30.

In the backlight source structure of the liquid crystal display apparatus of the present invention, the plurality of light-guiding light source elements 10, each of which has a light source and a light-source packaging body 102 having light-guiding effect, are used and connected with each other to form a light guide plate. Thus, it is not necessary to manufacture a single light guide plate, thereby saving manufacturing costs and simplifying procedures. In the meantime, the light uniformity of backlight structure can be adjusted by adjusting one light-guiding light source element 10, and the situation that an entire light guide plate cannot be used due to partial damage will not occur.

Second Embodiment

As shown from FIG. 1 to FIG. 5, FIG. 1 is an exploded perspective view of an assembly of a plurality of light-guiding light source elements 10 and an electric circuit board 20 according to an embodiment of the present invention; FIG. 2 is a perspective view of the assembly of the plurality of light-guiding light source elements 10 and the electric circuit board 20 according to the embodiment of the present invention; FIG. 3 is a perspective view showing an exterior structure of a single light-guiding light source element 10 according to the embodiment of the present invention; FIG. 4 is a perspective view showing a cross-sectional structure of the single light-guiding light source element 10 according to the embodiment of the present invention; and FIG. 5 is a partial cross-sectional side view of an assembly of a plurality of light-guiding light source elements 10, a sealing frame 30, a reflector 40 and an electric circuit board 20 according to a preferred embodiment of the present invention. It can be seen from FIG. 1 to FIG. 5 that:

A liquid crystal display apparatus includes a backlight source structure. The backlight source structure includes a plurality of light-guiding light source elements 10. Each of the light-guiding light source elements 10 includes:

at least one light source which is used to emit light; and a light-source packaging body 102 which is used to package the light source and guide the light emitted from the light source toward a display panel.

Each of the light-source packaging bodies 102 is an elongated strip having a light-guiding effect. The light-guiding light source elements 10 are connected with each other to form a light guide plate.

In the present embodiment, the light-guiding light source elements 10 are connected with each other through at least one detachable structure.

In the present embodiment, the at least one light source is an LED device 101; the LED devices 101 of the light-guiding light source elements are connected in parallel (as shown in FIG. 1 and FIG. 2). A lead 112 of the LED device 101 is directly connected to a chip 111 of the LED device 101 (as shown in FIG. 4), and another lead of the LED device is connected to an electric power. In the conventional technology, the chip 111 of the LED device 101 will need to be connected to the lead 112 through a wire. The present invention can save the use of wires and therefore reduce manufacturing cost.

In the present embodiment, the light source is packaged inside a side end of the light-source packaging body 102 (as shown in FIG. 3).

In the present embodiment, the light sources are packaged inside two opposite side ends of the light-source packaging body 102 (not marked in the figures).

In the present embodiment, the light-source packaging body 102 is made of acrylic plastics or polycarbonate.

In the present embodiment, as shown in FIG. 5, the backlight source structure further includes a reflector 40, a sealing frame 30 and an electric circuit board 20. The reflector 40 is fixed on a bottom surface of the light-source packaging body 102 via the sealing frame 30. The electric circuit board 20 is fixed near the light source on a top surface of the light-source packaging body 102 via the sealing frame 30.

In the liquid crystal display apparatus of the present invention, the backlight source structure thereof uses and connects a plurality of light-guiding light source elements 10, each of which has a light source and a light-source packaging body 102 having light-guiding effect, to form a light guide plate. Thus, it is not necessary to manufacture a single light guide plate, thereby saving manufacturing costs and simplifying procedures. In the meantime, the light uniformity of backlight structure can be adjusted by adjusting one light-guiding light source element 10, and the situation that an entire light guide plate cannot be used due to partial damage will not occur.

In conclusion, although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A backlight source structure of a liquid crystal display apparatus, comprising a plurality of light-guiding light source elements, wherein each of the light-guiding light source elements includes:

at least one light source used to emit light; and a light-source packaging body used to package the light source and guide the light emitted from the light source toward a display panel; wherein each of the light-source packaging bodies is an elongated strip having a light-guiding effect; the light-guiding light source elements are connected with each other to form a light guide plate; the light-guiding light source elements are connected with each other through at least one detachable structure; the at least one light source is an LED device; the LED devices of the light-guiding light source elements are connected in parallel; a lead of the LED device is directly connected to a chip of the LED device, and another lead of the LED device is connected to an electric power, wherein the backlight source structure further includes a reflector, a sealing frame and an electric circuit board; the reflector is fixed on a bottom surface of the light-source packaging body via the sealing frame; the electric circuit board is fixed near the light source on a top surface of the light-source packaging body via the sealing frame.

2. The backlight source structure as claimed in claim 1, wherein the light source is packaged inside a side end of the light-source packaging body.

3. The backlight source structure as claimed in claim 1, wherein the light sources are packaged inside two opposite side ends of the light-source packaging body.

4. The backlight source structure as claimed in claim 1, wherein the light-source packaging body is made of acrylic plastics.

5. The backlight source structure as claimed in claim 1, wherein the light-source packaging body is made of polycarbonate.

6. A backlight source structure of a liquid crystal display apparatus, comprising a plurality of light-guiding light source elements, wherein each of the light-guiding light source elements includes:
   at least one light source used to emit light; and
   a light-source packaging body used to package the light source and guide the light emitted from the light source toward a display panel; wherein
   each of the light-source packaging bodies is an elongated strip having a light-guiding effect; the light-guiding light source elements are connected with each other to form a light guide plate, wherein the backlight source structure further includes a reflector, a sealing frame and an electric circuit board; the reflector is fixed on a bottom surface of the light-source packaging body via the sealing frame; the electric circuit hoard is fixed near the light source on a top surface of the light-source packaging body via the sealing frame.

7. The backlight source structure as claimed in claim 6, wherein the light-guiding light source elements are connected with each other through at least one detachable structure.

8. The backlight source structure as claimed in claim 6, wherein the light source is at least one LED device; the LED devices of the light-guiding light source elements are connected in parallel; a lead of the LED device is directly connected to a chip of the LED device, and another lead of the LED device is connected to an electric power.

9. The backlight source structure as claimed in claim 6, wherein the light source is packaged inside a side end of the light-source packaging body.

10. The backlight source structure as claimed in claim 6, wherein the light sources are packaged inside two opposite side ends of the light-source packaging body.

11. The backlight source structure as claimed in claim 6, wherein the light-source packaging body is made of acrylic plastics or polycarbonate.

12. A liquid crystal display apparatus comprising a backlight source structure, wherein the backlight source structure includes a plurality of light-guiding light source elements, wherein each of the light-guiding light source elements includes:
   at least one light source used to emit light;
   a light-source packaging body used to package the light source and guide the light emitted from the light source toward a display panel; wherein
   each of the light-source packaging bodies is an elongated strip having a light-guiding effect; the light-guiding light source elements are connected with each other to form a light guide plate, wherein the backlight source structure further includes a reflector, a sealing frame and an electric circuit board; the reflector is fixed on a bottom surface of the light-source packaging body via the sealing frame; the electric circuit board is fixed near the light source on a top surface of the light-source packaging body via the sealing frame.

13. The liquid crystal display apparatus as claimed in claim 12, wherein the light-guiding light source elements are connected with each other through at least one detachable structure.

14. The liquid crystal display apparatus as claimed in claim 12, wherein the light source is at least one LED device; the LED devices of the light-guiding light source elements are connected in parallel; a lead of the LED device is directly connected to a chip of the LED device, and another lead of the LED device is connected to an electric power.

15. The liquid crystal display apparatus as claimed in claim 12, wherein the light source is packaged inside a side end of the light-source packaging body.

16. The liquid crystal display apparatus as claimed in claim 12, wherein the light sources are packaged inside two opposite side ends of the light-source packaging body.

17. The liquid crystal display apparatus as claimed in claim 12, wherein the light-source packaging body is made of acrylic plastics or polycarbonate.

\* \* \* \* \*